United States Patent [19]

Mansho

[11] 4,133,607
[45] Jan. 9, 1979

[54] CAMERA ACCESSORY

[76] Inventor: Etsuo Mansho, 94-1334 Hiana Pl., Waipahu, Hi. 96797

[21] Appl. No.: 850,722

[22] Filed: Nov. 11, 1977

[51] Int. Cl.² .......................................... G03B 29/00
[52] U.S. Cl. ..................................... 354/81; 354/293
[58] Field of Search ........................ 354/75, 81, 82, 74, 354/219, 223, 224, 293, 295; 350/301

[56] References Cited

U.S. PATENT DOCUMENTS

| 1,486,231 | 3/1924 | Cox | 354/75 X |
|---|---|---|---|
| 1,803,347 | 5/1931 | Owens | 354/81 |
| 2,165,512 | 7/1939 | Schofield | 354/293 X |
| 2,826,978 | 3/1958 | Klaeden | 354/293 |
| 2,887,019 | 5/1959 | Dodin | 354/155 |
| 3,883,883 | 5/1975 | Sano et al. | 354/75 |

Primary Examiner—Donald A. Griffin
Attorney, Agent, or Firm—Daniel Jay Tick

[57] ABSTRACT

A periscope unit is removably affixed to a camera with the eye piece of the camera in alignment with the top light opening of the periscope whereby a photographer looking into an eye piece at the bottom of the periscope sees through the eye piece of the camera positioned above the photographer.

2 Claims, 8 Drawing Figures

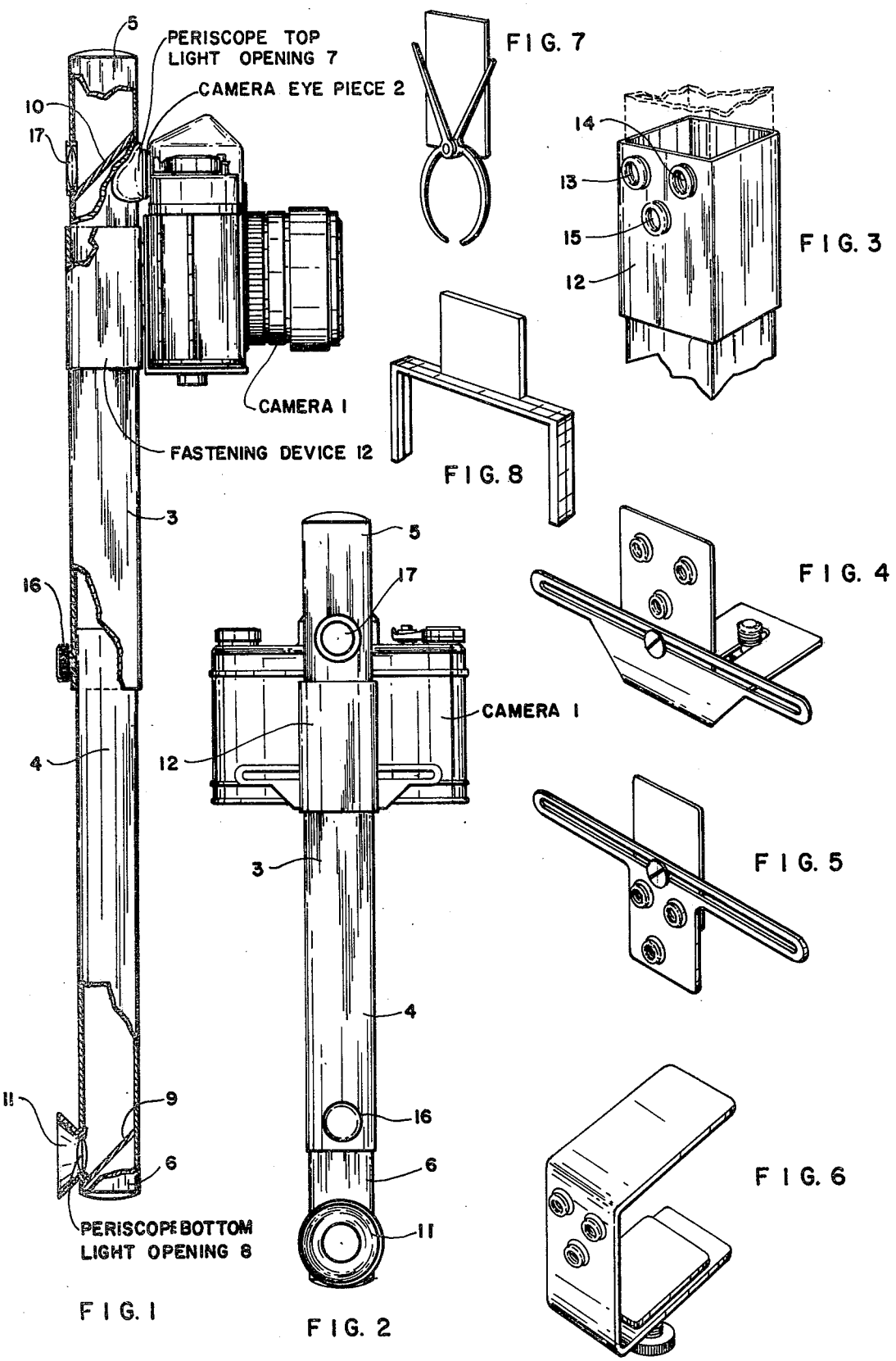

CAMERA ACCESSORY

BACKGROUND OF THE INVENTION

The present invention relates to a camera accessory. More particularly, the invention relates to a camera accessory for enabling a photographer having a predetermined height to position a camera at a height greater than the predetermined height and take a picture from the greater height with complete physical and visual control.

Camera accessories similar to that described herein are disclosed in the following United States patents. U.S. Pat. No. 1,486,231, issued Mar. 11, 1924 to Cox, U.S. Pat. No. 1,489,934, issued Apr. 8, 1924 to Eklund, U.S. Pat. No. 1,803,347, issued May 5, 1931 to Owens, U.S. Pat. No. 2,165,512, issued July 11, 1939 to Schofield, U.S. Pat. No. 2,796,815, issued June 25, 1957 to Kaplan et al and U.S. Pat. No. 3,140,339, issued July 7, 1964 to Nisperly et al.

Objects of the invention are to provide a camera accessory of simple structure, which is inexpensive in manufacture, affixed to, and removed from, a camera with facility, convenience and rapidity, used with facility and convenience, and functions efficiently, effectively and reliably to enable a photographer to position a camera at a height above his or her head and take a picture from such height with complete physical and visual control rather than the haphazard photographs taken by people in such circumstances without the camera accessory of the invention.

BRIEF DESCRIPTION OF THE DRAWINGS

In order that the invention may be readily carried into effect, it will now be described with reference to the accompanying drawings, wherein:

FIG. 1 is a side view, partly cutaway and partly in section, of an embodiment of the camera accessory of the invention, in extended position, affixed to a camera;

FIG. 2 is a rear view of the embodiment of FIG. 2, in shortened condition, affixed to the camera; and FIGS. 3, 4, 5, 6, 7 and 8 are perspective views of couplings of the camera accessory of the invention for coupling the periscope unit to the camera.

DETAILED DESCRIPTION OF THE INVENTION

The camera accessory of the invention enables a photographer having a predetermined height to position a camera 1 (FIGS. 1 and 2) at a height greater than the predetermined height and take a picture from the greater height with complete physical and visual control. The camera 1 has an eye piece 2 (FIG. 1) for visual observance of a scene prior to photographing such scene.

The camera accessory of the invention comprises a periscope unit 3, as shown in FIGS. 1 and 2, having a substantially tubular member 4 adjustable in axial length with spaced opposite top and bottom ends 5 and 6, respectively. The tubular member 4 comprises two or more telescopically coupled tubular members in order to provide the desired adjustability of axial length. A top light opening 7 is provided in the tubular member 4 at the top end 5 thereof, as shown in FIG. 1. A bottom light opening 8 (FIG. 1) is provided in the bottom end 6 of the tubular member 4. Mirrors 9 and 10 in the tubular member 4 (FIG. 1) direct light from the top light opening 7 to the bottom light opening 8 and an eye piece 11 (FIGS. 1 and 2) at said bottom light opening, in the usual manner.

A fastening device 12 on the tubular member 4 of the periscope unit 3 in the area of the top end 5 of said tubular member removably affixes the camera 1 to the periscope unit with the eye piece 2 of the camera in alignment with the top light opening 7 of the periscope. The fastening device 12 preferably comprises a sleeve which fits closely around the outside of the tubular member 4 and has snap fasteners 13, 14 and 15 (FIG. 3) thereon for removably affixing it to corresponding snap fasteners on the back of the camera 1.

A photographer first removably affixes his or her camera 1 to the tubular member 4 of the periscope unit 3 via the fastening device 12, with the eye piece 2 of the camera in alighment with the top light opening 7 of the periscope. He or she then adjusts the length of the tubular member 4 and secures such length via a set screw 16 (FIGS. 1 and 2). The photographer then looks through the eye piece 11 and is able to see the scene surveyed by the camera 1 due to the alighment of the camera eye piece 2 with the periscope top light opening 7. He or she may then snap a picture, as desired, under full physical and visual control, since by looking through the eye piece 11 of the periscope 3, the photographer sees through the eye piece 2 of the camera.

An additional light opening 17 (FIGS. 1 and 2) is provided in the tubular member 4 at the top end 5 thereof in alignment with the top light opening 7 of the periscope. An additional eye piece is provided at the additional light opening 17 to enable a photographer looking through the additional eye piece to see through the eye piece 2 of the camera and thereby use the camera at eye level without removing it from the periscope unit 3.

While the invention has been described by means of a specific example and in a specific embodiment, I do not wish to be limited thereto, for obvious modifications will occur to those skilled in the art without departing from the spirit and scope of the invention.

I claim:

1. A camera accessory for enabling a photographer having a predetermined height to position a camera at a height greater than the predetermined height and take a picture from the greater height with complete physical and visual control, the camera having an eye piece for visual observance of a scene prior to photographing the scene, said camera accessory comprising a periscope unit having a substantially tubular member adjustable in axial length with spaced opposite top and bottom ends, a top light opening in the tubular member at the top end, a bottom light opening in the tubular member at the bottom end, mirrors in the tubular member directing light from the top light opening to the bottom light opening and an eye piece at the bottom light opening;

fastening means on the tubular member of the periscope unit in the area of the top end thereof for removably affixing a camera to said periscope unit with the eye piece of the camera in alignment with the top light opening whereby a photographer looking into the eye piece at the bottom end of the periscope sees through the eye piece of the camera positioned above the photographer;

an additional light opening in the tubular member at the top end thereof in alignment with the top light opening; and an additional eye piece at the additional light opening whereby the photographer looking through the additional eye piece sees through the eye piece of the camera.

2. A camera accessory as claimed in claim 1, wherein said fastening means comprises a sleeve fitting closely around the outside of the tubular member of the periscope unit, said sleeve having snap fasteners thereon for removably affixing it to corresponding snap fasteners on the back of the camera.

* * * * *